May 18, 1965

P. C. BRADFORD 3,184,065

SETTLER

Filed Dec. 29, 1961

INVENTOR

PAUL C. BRADFORD

BY Oswald J. Milmore

HIS ATTORNEY

United States Patent Office 3,184,065
Patented May 18, 1965

3,184,065
SETTLER
Paul C. Bradford, Edwardsville, Ill., assignor to Shell Oil Company, New York, N.Y., a corporation of Delaware
Filed Dec. 29, 1961, Ser. No. 163,241
6 Claims. (Cl. 210—519)

The invention relates to gravity settlers particularly useful for settling suspended solids from liquids. It is concerned particularly with apparatus for settling particles which are so fine that they cannot be settled countercurrently to liquid flow without being brought together into agglomerates or pseudo-particles large enough to gravitate; however, the apparatus is not restricted to use with such fine particles.

Such settlers find application, inter alia, in the removal of powder-like catalyst from a slurry thereof in oil which is discharged from a catalytic conversion unit. However, they find many other applications, such as the settling of carbon particles from water and, in general, wherever finely divided solids must be settled.

It has heretofore been customary to use high-efficiency, horizontal-flow type settlers, known as thickeners, which have moving elements to form agglomerates; they are large and cumbersome installations requiring roofs and, often, means to admit blanketing gas to the space above the liquid; they require large sites. Attempts to use simple tanks or pot type settlers having liquid and solids outlets at the top and bottom, respectively, led to greatly reduced efficiency in that there was necessarily a net upflow of the liquid; it was necessary to form agglomerates large enough to gravitate countercurrent to the liquid flow, thereby imposing a limitation on the minimum particle size that can be settled.

It is an object of the invention to provide a settler which has no moving mechanical parts and occupies a small area which, nevertheless, avoids the upflow of liquid. More specifically, it is an object to provide a settler which combines the horizontal flow principle with the mechanical simplicity of the pot settler, whereby upward currents in the liquid are obviated and efficient settling becomes possible in a small pot.

Further objects are to provide a pot settler wherein the feed stream enters in a downward direction, whereby the kinetic energy of the solid particles is utilized to achieve settling from the liquid; to provide a settler wherein turbulence in the liquid is minimized to obviate upward currents within the liquid which would carry the solids upwards; and to insulate the settling dispersion thermally by means of the clarified liquid to avoid thermal currents.

In summary, the settler according to the invention comprises a vessel containing near the top a first wall defining a downwardly diverging inlet channel to decelerate the entering slurry and direct it into a central region of a second, downwardly convergent channel which is defined by a second wall and within which the solids are concentrated, there being a lateral opening at the top of the second channel for the efflux of the major part of the liquid by horizontal flow, said lateral opening including preferably a series of orifices uniformly spaced about the periphery of the second channel and imposing a low pressure drop to the flow of liquid to insure uniform horizontal flow in all directions. Preferably the second channel contains a central baffle defining a smaller, downwardly convergent concentration channel directly beneath the inlet channel and open at the bottom for concentrating the solids.

The clarified liquid flowing out of said lateral openings is preferably flowed downwards in contact with the outside of said second wall, so as to insulate the said second channel, to avoid disturbing thermal currents.

The invention will be further described with reference to the accompanying drawing forming a part of this specification and showing one preferred embodiment and one modification by way of illustration, wherein.

Figure 1:
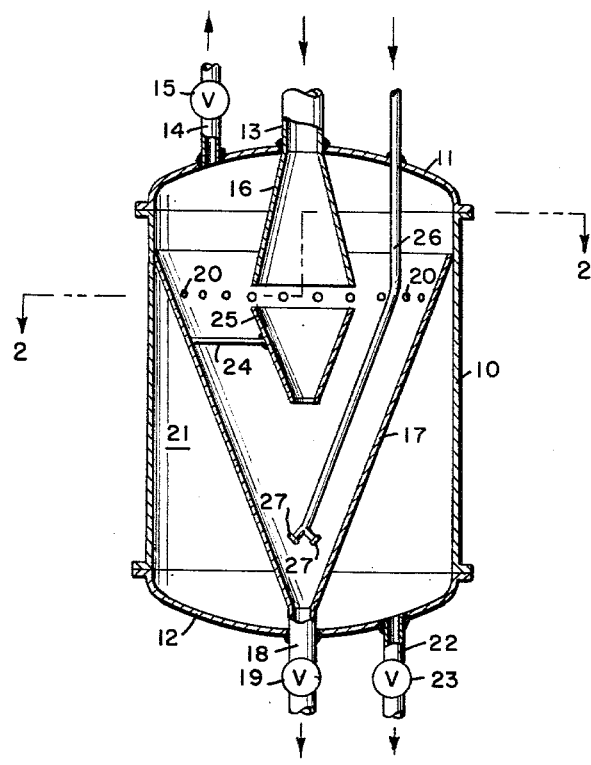
FIGURE 1 is a vertical sectional view through a settler in accordance with the invention.
Figure 3:
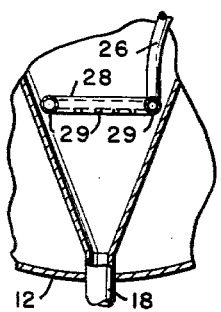
FIGURE 3 is a fragmentary sectional view of the bottom of the concentration cone showing a modification of the jetting means.
Figure 2:
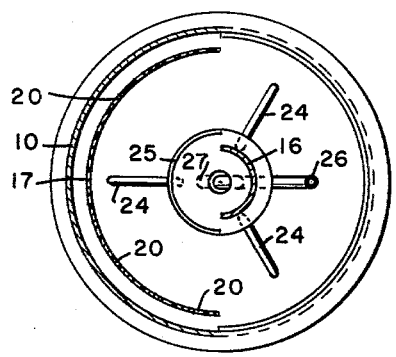
FIGURE 2 is a transverse sectional view taken on the line 2—2 of FIGURE 1.

Referring to FIGURES 1–3, the settler includes a closed cylindrical vessel 10 having top and bottom closures 11, 12 and fitted with an inlet nozzle 13 at the top. The top further has a vent 14 and a vent valve 15, to permit the vessel to be completely filled with liquid and to permit operation at any desired pressure. The upper part of the vessel contains a first wall 16, shaped at the frustum of a cone and defining a downwardly divergent deceleration channel which communicates at the top with the inlet nozzle 13. The wall is mounted at the central axis of the vessel and the bottom is smaller than the vessel having, for example, a diameter from one-fourth to one-half of the vessel diameter.

The lower part of the vessel contains a second wall 17, shaped as the frustum of a cone which is coaxial with the deceleration channel. The top of the second wall is situated as high as the bottom of the first wall and slopes to an apex at the bottom whereat is connected a discharge pipe 18 for settled solids which extends out through the vessel closure 13 and has a flow-control valve 19. The upper part of the second wall has a plurality of orifices 20 situated at approximately the level of the bottom of the first wall or somewhat below said level and communicating with the annular space or plenum chamber 21 between the second wall 17 and the wall of the vessel 10. These holes are situated at small, equal intervals about the periphery and are of equal sizes to insure uniform flow of clarified liquid outward from center of the vessel essentially horizontally in all directions. They preferably impose some restriction to the free flow of liquid, but not more than necessary to insure the uniform flow in all directions. Their sizes and number will vary with the expected rate of liquid flow but, in most instances, they should be sized to cause a pressure drop of between about 0.25 to 2 lbs. per sq. inch, preferably 0.5 to 1.0. The vessel has a liquid outlet nozzle 22, provided with a valve 23, connected to drain liquid from the bottom of the said space 21.

Mounted within the second wall structure by radial supports 24 which are thin and lie in vertical planes, is a third wall structure 25 in the form of the frustum of a cone and defining a central concentration channel which is coaxial with the other channels, downwardly convergent and open at the bottom some distance above the apex of the second wall structure. The top of the wall structure 25 is spaced vertically from and has a diameter about the same as that of the end of the deceleration channel.

A pipe 26 for carrier liquid is mounted to supply liquid to a plurality of nozzles 27 a short distance above the apex of the second wall.

According to a modification shown in FIGURE 3 the nozzles 27 are replaced by a spray ring 28 having a plurality of downwardly and outwardly directed orifices 29.

In operation, the slurry to be settled enters the settler at 13. Initially and from time to time the vent valve 15 is opened to permit vapor to escape, so that the vessel 10 is completely filled with liquid. The dispersion is decelerated in descending through the diverging passage in the cone 16. Upon reaching the lower end of this cone the liquid flows principally horizontally to the openings 20. The solid particles continue their downward flow into the central concentration channel within the wall structure 25, together with some of the liquid. The concentration of the solids within this channel is higher than that in the initial stream, and some agglomeration of solids occurs. At the lower end of the central channel the solids flow downwards with increased velocity and liquid associated therewith first flows horizontally outward and thereafter rises in the annular channel between the walls 17 and 25 to the openings 20. The further concentrated solids agglomerate further in the lower part of the channel defined by the wall 17 and settled therein. Near the bottom they are re-diluted by a carrier liquid injected via the pipe 26 and the nozzles 27 or spray ring 28, being carried out into the discharge pipe 18. By way of example, when the slurry consists of cracking catalyst discharged from a catalytic cracking unit and heavy oil not suitable for recycling, the carrying liquid may be a catalytically cracked heavy gas oil, which can be recycled to the cracking unit.

The decanted liquid flows through the orifices 20 into the plenum chamber 21. By providing a large number of such openings flow is uniform and slow in all radial directions, whereby a minimum of entrainment of the solids occurs. The liquid within the chamber 21 serves to insulate the conical concentration channel within the wall 17 against thermal changes. Because the liquid is usually at a higher temperature than the surrounding atmosphere, there would otherwise be a tendency for the liquid within and adjacent to the wall 17 to be cooled, causing downward flow; this, in turn, induces stronger upward currents of warmer oil, with the final result that settled particles can be carried upwards. By providing a jacket of decanted liquid having essentially the same temperature as the oil within the concentration channel this difficulty is obviated.

I claim as my invention:

1. A gravity settler for settling suspended solids from a liquid which comprises:
    (a) a vessel having an inlet
    (b) a first wall structure within said vessel defining a downwardly divergent deceleration channel which is open at the bottom and connected at the top to said inlet,
    (c) a second wall structure within said vessel defining a downwardly convergent concentration channel situated substantially beneath said deceleration channel, the top of the concentration channel being greater in area than the bottom of the deceleration channel,
    (d) an outlet for settled solids at the bottom of the concentration channel,
    (e) outlet means for clarified liquid situated near the top of said second wall and passing therethrough at locations spaced radially from and situated substantially at the level of the open bottom of said deceleration channel for the horizontal flow of liquid from said open bottom to the said outlet means, and
    (f) a third wall structure mounted within said concentration channel directly beneath and spaced from the first wall structure, said thrid wall structure defining a central concentration channel which is downwardly convergent and open at the bottom and being spaced from said second wall structure to provide an annular up-flow space.

2. A settler as defined in claim 1 wherein said outlet means (e) consist of a plurality of orifices formed in said second wall structure substantially at the level of the bottom of the deceleration channel and spaced from each other horizontally at uniform intervals.

3. A settler as defined in claim 2 wherein the diameter of said open bottom of the deceleration channel is less than about one-half of the diameter of said second wall structure at the level of said orifices.

4. In combination with the settler defined in claim 1, means for admitting a carrying liquid into the lower part of the concentration channel in a downward direction for diluting and carrying off the settled solids.

5. A gravity settler for settling suspended solids from a liquid which comprises:
    (a) a closed vessel including a top closure having an inlet therein,
    (b) vent means for discharging vapor from the top of the vessel,
    (c) a first frusto-conical wall mounted within said vessel to define a downwardly divergent deceleration channel, the top of said channel being connected to the top closure at said inlet, and the bottom of said wall, being spaced radially inwards on all sides from the vessel wall,
    (d) a second frusto-conical wall mounted within said vessel beneath and coaxially from said first wall and extending from the vessel wall at a level at least as high as that of the bottom of the first wall to an apex at the bottom and defining a downwardly convergent concentration channel,
    (e) an outlet for settled solids connected to the apex of the second wall and extending out of the vessel,
    (f) said second wall having, near the top thereof, a plurality of orifices situated at approximately the level of the bottom of the first wall and distributed about the periphery to cause equal flow of clarified liquid in all directions outward from the axis of said cone frusta, said orifices being in discharging relation to the space between the second wall and the wall of the vessel,
    (g) outlet means for discharging liquid from the bottom of the space mentioned in (f), and
    (h) a third frusto-conical wall mounted within the second wall and coaxially therewith in spaced relation beneath said first wall and defining a central concentration channel which has, at the top, an area approximately the same as that of the bottom of the deceleration channel and diverges downwardly to an open end, said third wall being spaced from said second wall to provide an annular up-flow channel.

6. In combination with the settler as defined in claim 5, means for admitting a carrying liquid into the lower part of the concentration channel of (d), beneath the third wall, in a downward direction.

References Cited by the Examiner

UNITED STATES PATENTS

| | | | |
|---|---|---|---|
| 624,963 | 5/99 | Nye | 210—533 X |
| 973,357 | 10/10 | Lewis et al. | 210—534 X |
| 1,148,834 | 8/15 | Emory | 210—532 |
| 1,177,849 | 4/16 | Kalb | 210—519 X |
| 1,427,446 | 8/22 | Denoel | 210—534 |
| 2,946,451 | 7/60 | Culleton | 210—512 |

FOREIGN PATENTS 43,692   7/29   Denmark.

REUBEN FRIEDMAN, *Primary Examiner.*

HERBERT L. MARTIN, *Examiner.*